April 24, 1962 C. L. LONGERT 3,030,986
PROCESS AND DEVICE FOR THE MECHANICAL
WORKING OF UNFELLED TREES
Filed Aug. 8, 1958 3 Sheets-Sheet 1
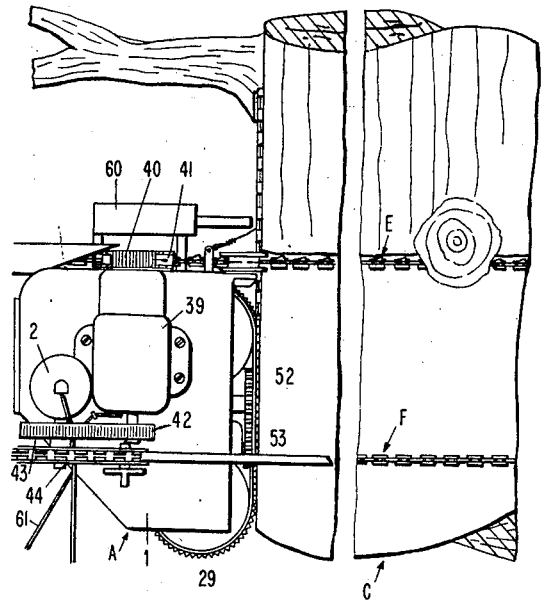
Fig.1a
Fig.1b
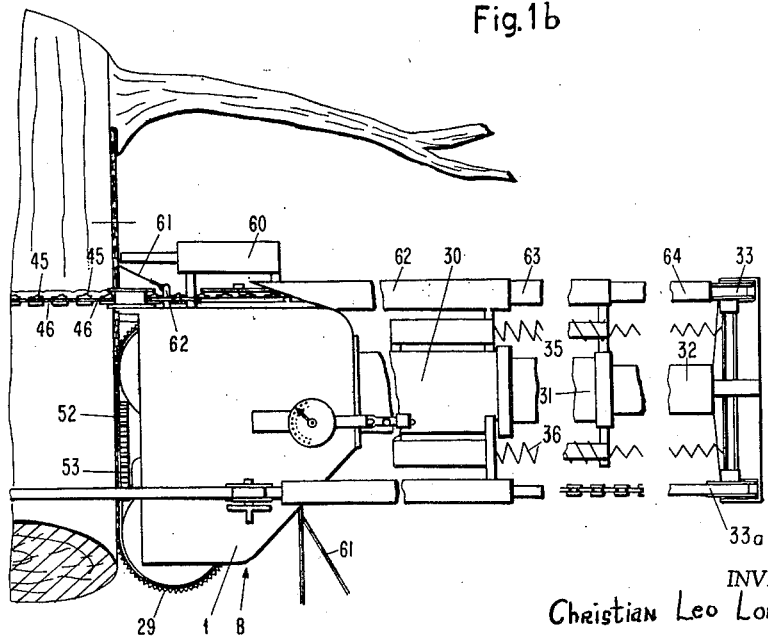
INVENTOR
Christian Leo Longert
BY Werner W. Kleeman
ATTORNEY April 24, 1962 C. L. LONGERT 3,030,986
PROCESS AND DEVICE FOR THE MECHANICAL
WORKING OF UNFELLED TREES
Filed Aug. 8, 1958 3 Sheets-Sheet 2

INVENTOR
Christian Leo Longert

BY Werner W. Kleeman
ATTORNEY

April 24, 1962

C. L. LONGERT 3,030,986

PROCESS AND DEVICE FOR THE MECHANICAL
WORKING OF UNFELLED TREES

Filed Aug. 8, 1958

INVENTOR
Christian Leo Longert

BY Werner W. Kleeman

ATTORNEY

United States Patent Office 3,030,986
Patented Apr. 24, 1962

3,030,986
PROCESS AND DEVICE FOR THE MECHANICAL
WORKING OF UNFELLED TREES
Christian Leo Longert, Vaduz, Liechtenstein
Filed Aug. 8, 1958, Ser. No. 754,045
Claims priority, application Switzerland Aug. 20, 1957
19 Claims. (Cl. 144—2)

The present invention relates to a novel method and apparatus for the mechanical working of unfelled trees. Under the term "mechanical working" shall be understood the debranching, debarking and felling of trees. As far as debranching and debarking is concerned, the device is particularly suitable and adapted for use in conjunction with the different species of pine woods.

Devices for the mechanical debranching of unfelled trees are already known. These devices however serve only to eliminate the dead branches appearing on the lower part of the tree. Moreover, in view of their construction they are not suitable for use on trees of relatively larger heights since the control and handling of the apparatus becomes more difficult with increased heights.

It is therefore an important object of the present invention to provide a method of and a device for the mechanical working of unfelled trees which avoids and overcomes the aforementioned drawbacks and difficulties, and in addition, permits debranching and debarking to be executed at the same time.

The device according to the present invention is especially outstanding insofar as at least two link connected climbing devices are provided, each of which are provided with suitable moving or climbing devices for application on the tree to be worked and which, by virtue of the movement of the climbing devices along the tree are positively connected with a suitable motor drive. Each climbing device is provided with suitable guiding and driving means for at least one element provided with a number of rotating knives, which element is constructed to embrace the tree, whereby provision is further made of means for keeping tightened or in tensioned condition the rotating endless element. The device may also incorporate means for felling debarked and debranched trees.

Still other objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

In the drawings:

FIGURES 1a and 1b are side views of a climbing device for mechanically working a tree designed according to the present invention as applied to diametrically opposed sides of a tree;

Figure 2:
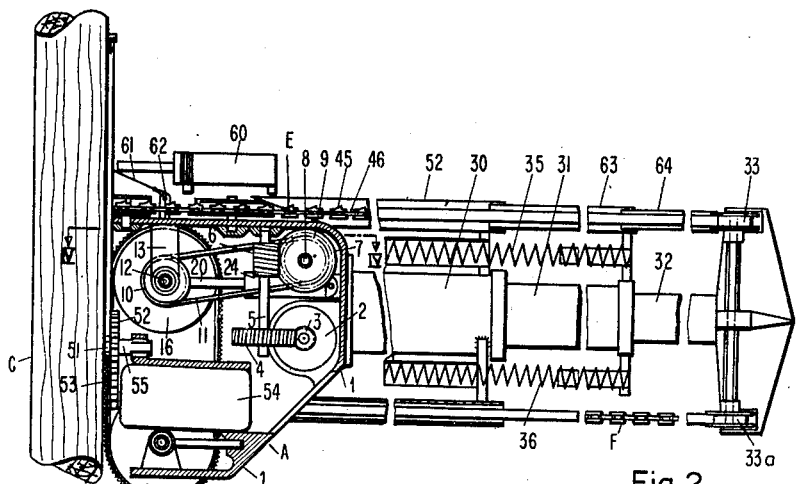
FIGURE 2 is a vertical sectional view illustrating the details of the climbing device shown in FIGURE 1.

As can best be seen in FIG. 1 the device for the mechanical working of unfelled trees in the embodiment shown is provided with two climbing devices numbered A and B which are positioned in diametrically opposed relationship on a tree C. By means of a connecting linkage member D, FIG. 5, climbing devices A and B are link connected. Chains E and F, guided and driven by the climbing devices A and B, embrace and work the tree C in a rotatable manner.

Both similarly constructed climbing devices A and B are provided with a separate drive housing 1 open at the side facing the tree.

Each drive housing contains an electrically operated drive motor 2 (FIGS. 2 and 5) which, through the intermediary of a gear train consisting of a worm 3, a wormwheel 4, a shaft 5, a worm 6 and a wormwheel 7 drives a shaft 8. By means of two sprocket wheels 9 and 10 and a chain 11 the shaft 8 is in positive driving connection with a shaft 12 which is supported by a pair of brackets 13 (see FIG. 2) of the drive housing 1. Both of the shaft ends are connected by Cardan drive with two end links 14 and 15, each of which is carrying a sprocket wheel 16 and 17, respectively, which are supported by fulcrum pins 18 and 19, respectively. See FIG. 4. The fulcrums 18 and 19, respectively are turning in vertical axes and brace themselves against the piston rod or bearing arms 20 and 21, respectively. The bearing arms 20 and 21 are each connected to a separate pneumatic piston 22 and 23, respectively moving in cylinders 24 and 25, respectively, said cylinders being mounted on the wall of housing 1, the cylinders 24 and 25 are suitably connected to a supply of compressed air or other pressure in any conventional manner (not shown). Displacement of the pistons 22 and 23 in the cylinders 24 and 25 generates a shifting of the axes of rotation of the end links 14 and 15 respectively, a turning of fulcrum pins 18 and 19 and accordingly a shifting of sprocket wheels 16 and 17.

Beneath the sprocket wheels 16 and 17 in the housing 1 there are provided two guide rolls 26 and 27, whereby over sprocket wheel 16 and guide roll 26, a climbing track 28 and over sprocket 17 and guide roll 27 a climbing track 29 is circumferentially arranged. Tracks 28 and 29 are pressed against tree C by means of air pressure or other means of pressure which exerts a pressure on the pistons 22 and 23 and serve for the movement of the climbing device along the tree.

Figure 4:
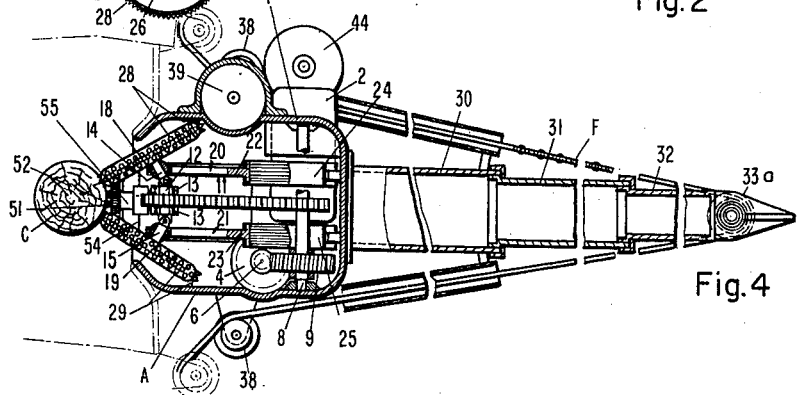
FIGURE 4 is a cross-sectional view of the device shown in FIGURE 2 taken along line IV—IV thereof.
Figure 5A:
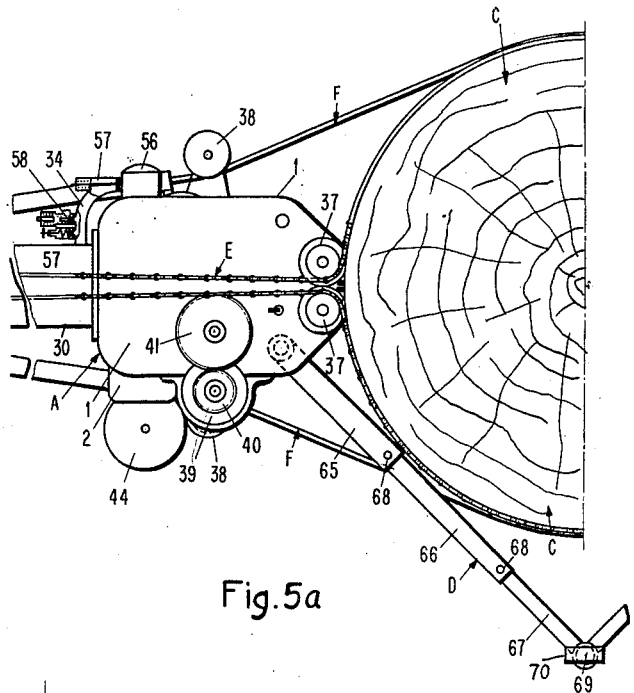
FIGURES 5a and 5b are plan views of the device shown in FIGURE 1 as applied to diametrically opposed portions of a tree.
Figure 5B:
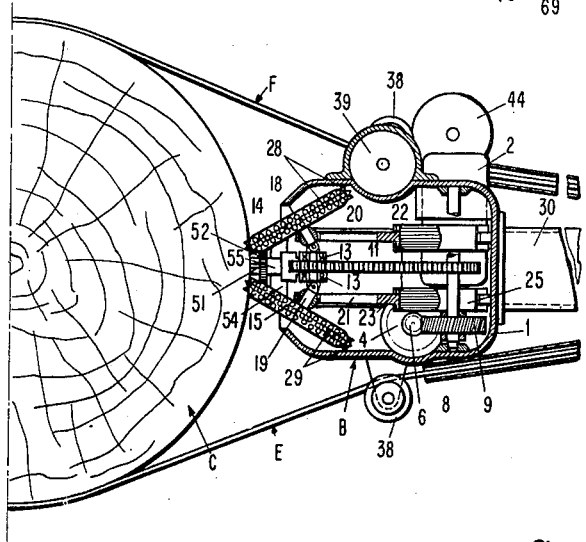

Opposite the open side of the housing, chain tensioner means consisting of the telescopically sliding pipes 30, 31 and 32 are arranged, see FIGS. 1, 2 and 4, whereby on pipe 32 are mounted a pair of rotatable tensioning rollers 33 and 33a which are positioned vertically above each other. Pipes 30, 31 and 32 are designed to serve as pressure cylinders and can be expanded by applying a pressure medium through piping 34 (FIG. 5). For retraction of the same, at least two springs 35 and 36 are provided which act against the pressure medium.

Over the tensioning rollers or idler rolls 33 and 33a run the chains E and F whereby for guiding chain E two guide rollers 38 on the sides of the housing are provided.

For driving the chains E and F the housing 1 carries an electric motor 39 which is in positive driving connection with chain E via gears 40 and 41 (FIG. 5), and via gears 42, 43 and 44 (FIG. 1) with chain F. Whereas chain E by means of idler rolls 37 (FIG. 5) is positioned about the entire circumference of tree C, and supports the cutting knives which are held together by connecting links 46 (FIGS. 1 and 2), chain F is in contact with only a small part of the tree. Chain E, is provided with said knives for the debranching, debarking and eventually also felling of the tree, whereas chain F is for the purpose of security only and prevents the device from falling to earth if chain E should break.

It is possible to provide chain F with more knives for the finishing of the trees. It would also be possible to carry chain F in a manner around the tree similar to chain E. The chains E and F are rotating in a sense opposite to each other so that the shearing forces resulting from the movement of the chains, balance one another.

Figure 3A:
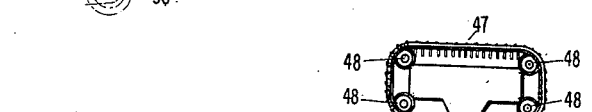
FIGURE 3a is a fragmentary view showing the positioning of the auxiliary cutter and bolt shooting device with respect to the tree.
Figure 3:
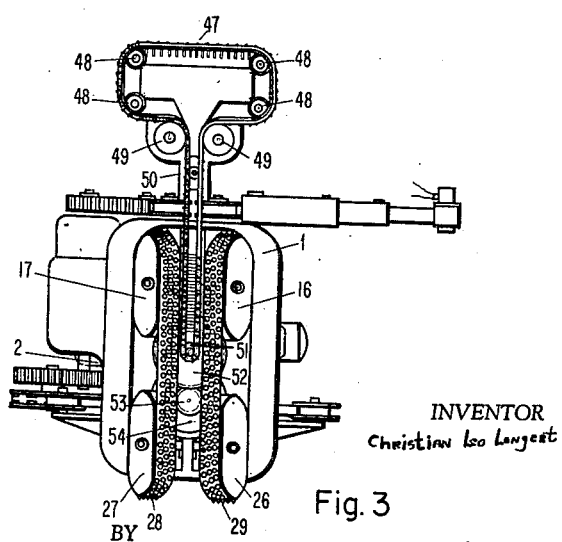
FIGURE 3 is a front view of the climbing device illustrated in FIGURE 2 showing the details of the climbing tracks and auxiliary cutter unit.

In order to provide along tree C a clearance for the travel of the two climbing devices, each of these devices is provided with an auxiliary cutting device provided with a cutting chain 47 (FIG. 3). This chain 47 is carried over four idler rolls 48 and two idler rolls 49 which are carried by a support 50 situated on the housing 1. Chain 47 is working in downward direction between idler rolls 49 and the two tracks 28 and 29 and is wound about the chain wheel 51 which is in positive driving connection with an electric motor 54 by means of gear wheel 52 and ratchet 53. Chain wheel 51 and gear wheel 52 are mounted on shaft 55 (FIGS. 4 and 5) in drive housing 1. By means of the auxiliary cutting device, all branches knots and other deformations which are in the way of the climbing device are eliminated in order to provide smooth tracks or surfaces for the same. In order to provide chain tensioning devices 30, 31 and 32 as well as cylinders 24 and 25 with pressure, on drive housing 1 is mounted a by-pass valve 57 (FIG. 5) which is connected with piping 34. Also, between the by-pass valve 57 and pipe 30 in piping 34 are provided valves 58 and 59 of which valve 58 is a magnetically operated control valve and valve 59 a safety valve. The magnetic valve 58 releases the pressure in the pipes of the clamping device, for example in the event the same is to be taken off the tree.

Both climbing devices, as can be seen from FIG. 1 are provided with a bolt gun 60 which serves for shooting a bolt (not illustrated) into the tree. This device, which is operated electrically through sources independent from the drive motors, is used when the device is taken off the tree to be hauled down to earth by rope, i.e. after finishing debarking and debranching operations. For this purpose, bolt gun 60 may be provided with a rope hook through which is carried a suitable rope 61, for instance made of nylon, which is fastened at 62 onto the climbing device and, for instance, on a rope drum (not illustrated) at the foot of the tree. In order to protect the chains from falling branches the parts of the same extending to the idler rolls 33 and 33a are covered by sliding hoods 62, 63 and 64, whereby hoods 62 are fastened to pipe 30, hoods 63 to pipe 31 and hoods 64 to pipe 32.

Connecting link member D (FIG. 5) between the climbing devices A and B consists of telescopically sliding pipes 65, 66 and 67 forming carrying arms and, whereby the sliding pipes, by means of bolts 68 are adjustable to length. The two arms are connected together by means of a coupling member 69. Because of the adjustability of the total length of both arms through adjusting the position of the pipes, the total length of the connecting member D can easily be made to fit the diameter of the tree.

For commencing work, the tree C is initially debarked near its foot in order to apply the device. The rotating chains E and F are for this purpose provided with easy to open chain locks (not illustrated) by means of which the climbing devices can be taken apart and also joined together. In the manner illustrated, the chains are brought over the idler rolls of the climbing devices and after that are closed by said locks, whereupon they may be tensioned by means of the tensioning devices 30, 31 and 32. At the same time, by supplying pressure to the cylinders 24 and 25 an adjustment of pistons 22 and 23 can be made to such an extent where sprocket wheels 18 and 19 become positioned in planes which converge at least approximately in the longitudinal axis of tree C. The adjustability of the sprocket wheels therefore serves the purpose of obtaining the best suitable operating or rolling conditions for the crawler tracks 28 and 29. After that, the climbing devices can be put into operation by starting electric motors 39 and 54 and electric motor 2 after which both climbing devices under simultaneous rotation of chains E and F as well as auxiliary cutting chain 47 are moving up the tree. The driving operation of the motors are variably adjustable in order to adjust the climbing speeds of the climbing devices A and B. It is also possible to provide connecting member D with a mercury switch 70 which cuts off motor 2 of the faster moving climbing device after having reached a certain height difference in order to wait for the slower climbing device. The mercury switch 70 is preferably mounted at the junction of the connecting arm D in the region of coupling member 69. In a known manner, the mercury column of the mercury switch 70 will tilt when the connecting arm D is not level such that the motor of the faster moving climbing device is disengaged.

To meet this purpose electric motors 2 are used the direction of rotation of which is reversible so that the climbing devices, after having finished their work, can descend the tree.

Instead of tracks, also sharp edged wheels or similar devices may be used. It is also conceivable that for tensioning the chain, instead of pressure means, springs are used which, for example, can be mounted in the pipes 30 and 32.

According to the diameter of the tree to be worked, it is also possible to work with three or four climbing devices instead of two in such a way that the rotating chains E and F are wound around the guide rolls of the corresponding climbing devices.

Actually, the auxiliary cutting chain is pressed more loosely into the tree for which purpose, for example, a spring acting against the guides of the chain can be used. In order to completely clean the tree in the area of the tracks, the chain guide ways can be adjustably designed round in accordance with the rounding, respectively radius of the tree.

In order to avoid that the chains cut or eat into the tree, said chains may be provided with inwardly directed rolls or rollers which, to facilitate movement axially of the tree, may be rounded at their front faces. The cuting profiles of the cutters of the chain may also be rounded. In order to avoid jamming of the chain when the climbing devices are not working synchronously, links of steel wire for example can be inserted between fixed links. Thus, the chain will become flexible in two dimensions.

For the automatic limitation of the travel of the climbing devices, it may become desirable to operate a switch in contact with the tree which is acting at the moment when the pressure counter or the diameter of the tree is falling below a certain limit.

For felling the tree after debarking and debranching, the device described above can also be used. In order to accomplish this, the device is equipped with a rotating chain having inwardly pointing saw teeth (not illustrated) and which is replacing chain E of the device described above. By steady, continuous tensioning of this rotating chain by means of tensioning devices 30, 31 and 32 the necessary sawing pressure is exerted on the rotating chain in order to saw the tree from both sides. It is also possible to guide the chain over the one side of the tree over additional adjustable rolls, so that sawing or cutting is done from one side only.

In certain cases, it may appear advisable to use for the felling of the tree an additional device which is similar to the one described before, but which is provided with clamping jaws instead of a climbing device. By such an arrangement, the respective tracks and sprocket wheels in the individual climbing devices become unnecessary as well as the electric motors and drive gears.

Also, in such a case, the second cutting chain as well as the auxiliary cutting chain with its drive may be eliminated. Also, the bolt shooting devices are not necessary in this case.

Having thus described the invention what is claimed as new and desired to be secured by United States Letters Patent, is:

1. In a machine for the working of trees and the like; the improvement of, housing means adapted to be supported on the surface of a tree to be worked, climbing means supported by said housing means for ascending and descending the length of said tree, drive means cooperable with said climbing means to impart movement thereto, chain means for working said tree and cooperable with said housing means for contacting the surface of the tree to be worked, tensioning means in registry with said chain means to maintain the latter in tensioned condition in order to keep said housing means in registry with said surface of said tree.

2. In a machine for the mechanical working of trees and the like; the improvement of, housing means adapted to be supported on the surface of a tree to be worked, climbing means supported by said housing means for ascending and descending the length of said tree, drive means cooperable with said climbing means to impart movement thereto, chain means including cutting knives for working said tree and cooperable with said housing means for contacting the surface of the tree to be worked, drive means in registry with said chain means to rotate the latter in a horizontal plane, tensioning means in registry with said chain means to maintain the latter in tensioned condition in order to urge said housing means toward said surface of said tree.

3. In a machine for the mechanical working of trees and the like; the improvement of, housing means adapted to be supported on the surface of a tree to be worked, climbing means supported by said housing means for ascending and descending the length of said tree, drive means cooperable with said climbing means to impart movement thereto, chain means for working said tree and cooperable with said housing means for contacting the surface of the tree to be worked, drive means in registry with said chain means to rotate the latter in a horizontal plane, said climbing means including track means for frictionally engaging the surface of said tree, tensioning means in registry with said chain means to maintain the latter in tensioned condition in order to urge said housing means toward said surface of said tree.

4. In a machine for the mechanical working of trees and the like, housing means adapted to be supported on the surface of a tree to be worked, climbing means supported by said housing means for ascending and descending the length of said tree, drive means cooperable with said climbing means to impart movement thereto, chain means for mechanically working said tree and carried by said housing means for contacting the surface of the tree to be worked, tensioning means in registry with said chain means to maintain the latter in tensioned condition in order to urge said housing means toward said surface of said tree, and auxiliary cutting means cooperable with and disposed above said climbing means for working the surface of said tree to remove undesirable appendages to provide a smooth surface for said climbing means.

5. In a machine for the mechanical working of trees and the like; the improvement of, housing means adapted to be supported on the surface of a tree to be worked, climbing means supported by said housing means for ascending and descending the length of said tree, drive means cooperable with said climbing means to impart movement thereto, endless rotatable tree embracing means provided with cutting knives for working said tree and cooperable with said housing means for contacting the surface of the tree to be worked, drive means in registry with said endless rotatable means to rotate the latter in a horizontal plane, said climbing means including track means for frictionally engaging the surface of said tree, tensioning means including telescopically sliding pipes in registry with said endless rotatable means to maintain the latter in tensioned condition in order to urge said housing means toward said surface of said tree.

6. In a machine for the mechanical working of trees and the like, according to claim 5, said endless rotatable tree embracing means being at least one chain element carrying said cutting knives, said cutting knives serving to debark and debranch said tree.

7. In a machine for the mechanical working of trees and the like according to claim 5, said endless rotatable tree embracing means being at least two separately driven counter-rotating endless, flexible chain members, at least one of said chain elements being provided with said cutting knives and completely encircling said tree.

8. In a machine for the mechanical working of trees and the like according to claim 7, wherein roller means having rounded faces contacting said tree are carried by at least said one chain element to facilitate movement thereof along said tree.

9. In a machine for the mechanical working of trees and the like; the improvement of, housing means adapted to be supported on the surface of a tree to be worked, climbing means supported by said housing means for ascending and descending the length of said tree, drive means cooperable with said climbing means to impart movement thereto, endless rotatable tree embracing means provided with cutting knives for working said tree and cooperable with said housing means for contacting the surface of the tree to be worked, drive means in registry with said endless rotatable means to rotate the latter in a horizontal plane, said climbing means including track means for frictionally engaging the surface of said tree, tensioning means including telescopically sliding pipes in registry with said endless rotatable means to maintain the latter in tensioned condition in order to urge said housing means toward said surface of said tree, said tensioning means including pressure means for expanding the length of said telescopically sliding pipes, and resilient means communicating with said telescopically sliding pipes for retracting the latter.

10. In a machine for the mechanical working of trees and the like according to claim 9, wherein valve means are provided for actuating said pressure means to control the sliding movement of said telescopically sliding pipes.

11. In a machine for the mechanical working of trees and the like; the improvement of, housing means adapted to be supported on the surface of a tree to be worked, climbing means supported by said housing means for ascending and descending the length of said tree, drive means cooperable with said climbing means to impart movement thereto, endless rotatable means having cutting knives for working said tree cooperable with said housing means for contacting the surface of the tree to be worked, drive means in registry with said endless rotatable means to rotate the latter in a horizontal plane, said clamping means including track means for frictionally engaging the surface of said tree, tensioning means in registry with said endless rotatable means to adjustably maintain the latter in tensioned condition in order to urge said housing means toward said surface of said tree, and means cooperable with said climbing means for urging the latter into frictional engagement with the surface of said tree.

12. In a machine for the mechanical working of trees and the like according to claim 11, wherein said urging means cooperable with said climbing means includes displaceable linkage means, piston means in registry with said linkage means and adapted to be actuated by a fluid medium for displacing said linkage means, and means cooperable with said piston means for displacing the latter.

13. In a machine for the mechanical working of trees and the like according to claim 12, wherein said climbing means is provided with a bolt shooting device for driving an anchoring means into a tree being worked whereby said machine can be lowered on a cable means attached thereto.

14. In a machine for the mechanical working of trees and the like; the improvement of, individual housing means adapted to be supported in diametrically opposed relation on the surface of a tree to be worked, climbing means supported by each of said individual housing means for ascending and descending the length of said tree, drive means cooperable with said climbing means to impart movement thereto, separate endless rotatable means provided with cutting knives for working said tree and cooperable with said housing means for contacting the surface of the tree to be worked, drive means in registry with said separate endless rotatable means to rotate the latter in a horizontal plane, said climbing means including track means for frictionally engaging the surface of said tree, tensioning means in registry with said separate endless rotatable means to adjustably maintain the latter in tensioned condition in order to urge said housing means toward said surface of said tree.

15. In a machine for the mechanical working of trees and the like; the improvement of, individual housing means adapted to be supported in diametrically opposed relation on the surface of a tree to be worked, climbing means supported by each of said housing means for ascending and descending the length of said tree, drive means cooperable with said climbing means to impart movement thereto, separate endless rotatable means provided with cutting knives for working said tree and cooperable with said housing means for contacting the surface of the tree to be worked, drive means in registry with said separate endless rotatable means to rotate the latter in a horizontal plane, said climbing means including track means for frictionally engaging the surface of said tree, tensioning means in registry with said separate endless rotatable means to adjustably maintain the latter in tensioned condition in order to urge said housing means toward said surface of said tree, and displaceable connecting means for adjustably interconnecting and retaining said housing means in diametrically opposed relation.

16. In a machine for the mechanical working of trees and the like according to claim 15, said displaceable connecting means including telescopically sliding pipe elements.

17. In a machine for the mechanical working of trees and the like according to claim 15, wherein mercury switch means is disposed between said climbing means to control said drive means and equalize movement of said climbing means.

18. In a machine for the mechanical working of trees and the like; the improvement of, individual housing means adapted to be supported in diametrically opposed relation on the surface of a tree to be worked, connecting means for adjustably interconnecting said housing means, climbing means supported by each of said individual housing means for ascending and descending the length of said tree, drive means cooperable with said climbing means to impart movement thereto, individual chain means at least one of which is provided with cutting knives for working said tree cooperable with said individual housing means for contacting the surface of the tree to be worked, drive means in registry with said individual chain means to rotate the latter in a horizontal plane, said climbing means including track means for frictionally engaging the surface of said tree, tensioning means in registry with said individual chain means to adjustably maintain the latter in tensioned condition in order to urge said housing means toward said surface of said tree, and auxiliary cutting means disposed above said climbing means and cooperable therewith for working the surface of said tree to remove undesirable appendages to provide a smooth surface on said tree for movement of said climbing means.

19. In a machine for the mechanical working of trees and the like; the improvement of, individual housing means adapted to be supported in diametrically opposed relation on the surface of a tree to be worked, connecting means for adjustably interconnecting said housing means, climbing means supported by each of said individual housing means for ascending and descending the length of said tree, drive means cooperable with said climbing means to impart movement thereto, individual chain means at least one of which is provided with cutting knives for working said tree cooperable with said individual housing means for contacting the surface of the tree to be worked, drive means in registry with said individual chain means to rotate the latter in a horizontal plane, said climbing means including track means for frictionally engaging the surface of said tree, tensioning means in registry with said individual chain means to adjustably maintain the latter in tensioned condition in order to urge said housing means toward said surface of said tree, said tensioning means including slidably adjustable telescopic pipe elements and means for adjusting the length thereof, and auxiliary cutting means disposed above said climbing means and cooperable therewith for working the surface of said tree to remove undesirable appendages to provide a smooth surface on said tree for movement of said climbing means.

References Cited in the file of this patent

UNITED STATES PATENTS

| | | |
|---|---|---|
| 2,477,922 | Emery et al. | Aug. 2, 1949 |
| 2,482,392 | Whitaker | Sept. 20, 1949 |
| 2,581,479 | Grasham | Jan. 8, 1952 |
| 2,583,971 | Shuff | Jan. 29, 1952 |
| 2,707,007 | Shuff | Apr. 26, 1955 |
| 2,727,335 | Susil | Dec. 20, 1955 |
| 2,871,620 | Bathe | Feb. 3, 1959 |

FOREIGN PATENTS

| | | |
|---|---|---|
| 44,092 | Sweden | May 29, 1918 |